United States Patent [19]
Au et al.

[11] Patent Number: 6,037,983
[45] Date of Patent: Mar. 14, 2000

[54] HIGH QUALITY REDUCED LATENCY TRANSMISSION OF VIDEO OBJECTS

[75] Inventors: Peter H. Au, Hermosa Beach; David B. Shu, West Hills, both of Calif.

[73] Assignee: Hughes Electronics Corporation, El Segundo, Calif.

[21] Appl. No.: 08/745,588

[22] Filed: Nov. 8, 1996

[51] Int. Cl.[7] .................................................. H04N 7/26
[52] U.S. Cl. ........................ 348/399; 348/384; 382/232
[58] Field of Search ................................. 348/390, 399, 348/420, 421, 422, 426, 429, 715, 716, 7, 12, 13, 6, 384; 382/243, 239, 232, 128; 455/3.1, 5.1, 4.2, 6.1; H04N 7/12, 7/26

[56] References Cited

U.S. PATENT DOCUMENTS

| | | | |
|---|---|---|---|
| 5,122,873 | 6/1992 | Golin ..................................... | 358/133 |
| 5,363,138 | 11/1994 | Hayashi et al. ...................... | 348/390 |
| 5,430,486 | 7/1995 | Fraser et al. ......................... | 348/426 |
| 5,706,290 | 1/1998 | Shaw et al. .......................... | 370/465 |
| 5,710,835 | 1/1998 | Bradley ................................ | 382/233 |
| 5,778,098 | 7/1998 | Lee et al. . | |
| 5,796,855 | 8/1998 | Lee . | |
| 5,886,743 | 3/1999 | Oh et al. ............................... | 348/407 |

OTHER PUBLICATIONS

AT&T Technical Journal; p. 85; Aravind et al. "Image and Video Coding Standards", Jan. 1993.

*Primary Examiner*—Chris Grant
*Attorney, Agent, or Firm*—John A. Crook; Michael W. Sales

[57] ABSTRACT

A system and method for transmitting a video object used in generating a plurality of frames of a video sequence over a limited bandwidth channel to reduce latency associated therewith includes separating the video object into a plurality of segments each having a size based in part on the limited bandwidth of the channel, identifying and transmitting at least one of the segments necessary for generation of an initial frame of the video sequence, and generating and displaying one or more of the initial frames based on the segment. The system and method may also intentionally reduce resolution of one or more segments to meet timing requirements association with generation and display of the at least one frame of a video sequence. In this situation, a residual representation of the segment is transmitted when bandwidth is available to improve resolution and quality of the originally transmitted segment and object resulting therefrom.

13 Claims, 4 Drawing Sheets

HIGH QUALITY REDUCED LATENCY TRANSMISSION OF VIDEO OBJECTS

CROSS-REFERENCE TO RELATED APPLICATION

The present invention is related to copending application Ser. No. 08/745,568, entitled "Hierarchical Low Latency Video Compression", filed on Nov. 8, 1996, and assigned to the assignee of the present invention, the disclosure of which is incorporated by reference herein.

TECHNICAL FIELD

The present invention relates to transmission of digital video sequences to reduce transmission latency and improve quality.

BACKGROUND ART

Digital video technology is used in a growing number of applications such as cable television, direct broadcast satellite services, high-definition television, and the like. Digital representations of video signals often require a very large number of bits. As such, a number of systems and methods are currently being developed to accommodate transmission and storage of still images and video sequences using various types of compression technology implemented in both hardware and software.

The availability of economically feasible and increasingly more powerful microprocessors allows integration of natural and synthetic audio and video sequences. Information in the form of audio and video sequences may be integrated to present real-time and non-real-time information in a single sequence. To provide audio and video sequences having acceptable quality using diverse communication channels having various bandwidths and associated communication rates requires continuous improvement to obtain higher compression ratios and reduction of the delays or latencies due to encoding, transmission, decoding, and compositing.

In general, quality, as measured by resolution, is compromised to obtain an acceptable transmission latency. However, it is desirable to provide a method for reducing latency which does not result in such a reduction as perceived by the viewer.

An audio/visual (AV) object may be used to represent a physical (real) or virtual article or scene. AV objects may be defined in terms of other AV objects which are referred to as sub-objects. An AV object which is not a composite or a compound AV object is referred to as a primitive. A sprite or basis object is an AV object created within a block of pixels that can be manipulated as a unit using geometrical transformations. Rather than re-transmitting and re-displaying the sprite object, new transformation parameters are provided to generate subsequent video frames. This results in a significant reduction in the amount of data necessary to represent such frames.

A small sprite object may represent a character in a video game whereas a large sprite object may represent an image which is larger than an individual frame and may span a number of frames. For example, a still image of a video layer of a scene, such as the background of a room, may be represented by a large sprite object. A particular video sequence in which a camera pans across the room would have a number of frames to depict motion of the camera. Rather than transmitting a still image for each frame, only the transformation parameters are required to manipulate a portion of the sprite object which is reused multiple times as the video frames are generated.

A prior art method of displaying a digital video sequence using sprites requires the sprites to be encoded and transmitted at the beginning of the video sequence or scene change. Transformation parameters are then transmitted and applied to generate the various frames for the sequence. This results in a significant delay (high latency) before beginning display of the video sequence because the sprite objects must be available to the decoder before any frames can be reconstructed and displayed. In addition, the spite object (basis object) is traditionally fixed after it has been transmitted and stored at the beginning of the encoded video sequence.

SUMMARY OF THE INVENTION

As such, one object of the present invention is to provide a system and method for reducing the latency associated with transmitting a high quality video sequence over a limited bandwidth channel.

Another object of the present invention is to provide a system and method for displaying a video sequence depicting motion using sprite objects which reduces the latency associated with prior art methods.

A further object of the present invention is to provide a system and method for representing a high quality video sequence generated from a sprite object where the sprite object is separated into a number of fragments with a fragment corresponding to a first frame transmitted along with corresponding transformation parameters to reduce the latency associated with transmitting the entire sprite object.

In carrying out the above objects and other objects and features of the present invention, a method is provided for transmitting a video object used in generating a plurality of frames of a video sequence over a limited bandwidth channel to reduce latency associated with display of the video sequence. The method includes separating the video object into a plurality of segments, each segment size being based in part on the limited bandwidth of the channel and assigning a priority to each of the plurality of segments corresponding to relative order of the segment in generating the plurality of frames within the video sequence. The method further provides for transmitting a first one of the plurality of segments based on the corresponding priority and generating and displaying at least one of the plurality of frames based on the first one of the plurality of segments to reduce the latency associated with the display of the video sequence.

In one embodiment, the step of separating the object includes separating the object into a plurality of columns each having a width which is a multiple of a predetermined value. Another embodiment includes determining whether the segment is needed to generate a subsequent one of the frames and transmitting a residual representation of the segment if the step of determining indicates the segment is needed in subsequent frames.

A system is also provided in accordance with the present invention for displaying a plurality of frames defining a video sequence based on a stored representation of at least one video object. The system includes a first memory for storing video data in communication with a display for rendering a visual representation of the video data for each of the frames in the video sequence, and a second memory for storing data representing the video object. The system also includes control logic in communication with the display, the first memory, and the second memory which loads the second memory with data representing a portion (fragment or segment) of the video object, and generates data representing a first frame in the sequence based on the portion of the video object. The control logic then stores the generated data in the first memory to effect display of the visual representation of the first frame so as to reduce latency associated therewith.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
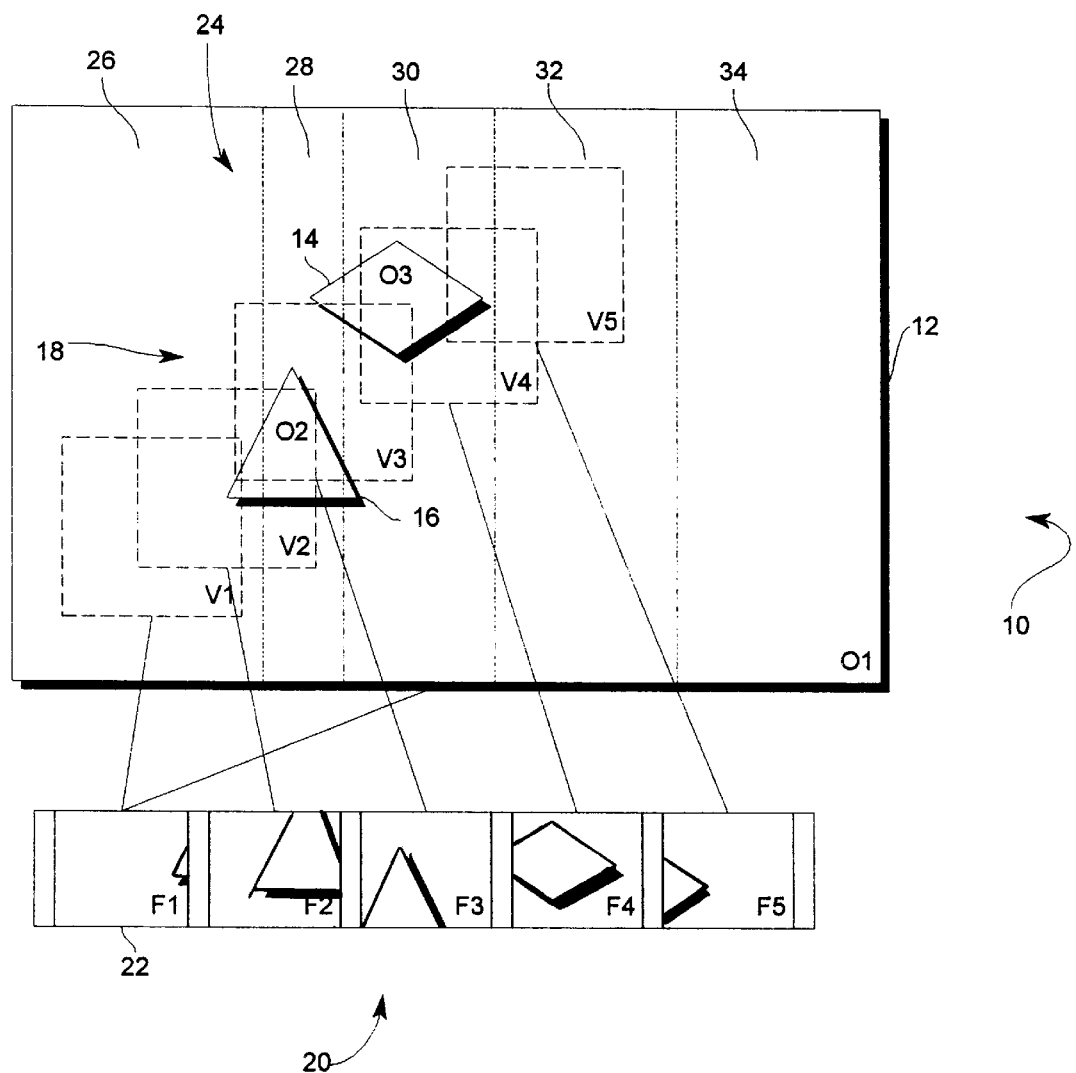
FIG. 1 is a graphical representation of various video objects represented in frames of a video sequence illustrating segmentation or fragmentation according to the present invention.

Referring now to FIG. 1, a graphical representation of a video scene represented by a plurality of frames is shown. Scene 10 includes a number of video objects (01–03), any one or more of which may be designated as basis objects or sprite objects. Object 12 may represent the background of scene 10 while object 14 may represent a real object and object 16 may represent a virtual or synthetic object. A number of views (V1–V5), indicated generally by reference numeral 18 are represented by a video sequence 20 having a plurality of frames (F1–F5), such as frame 22. In the example illustrated in FIG. 1, a camera pans from view V1 to view V5. To generate the images of sequence 20, transformation parameters are applied to the various objects 12, 14, and 16. As such, the prior art methods require at least object 12 and object 16 to be transmitted and decoded along with the corresponding transformation parameters prior to display of frame 22. As illustrated, object 12 is significantly larger than a single frame of video. This may result in a significant delay prior to display of the first frames due to the large amount of data which must be transferred.

As explained in greater detail below, the present invention separates each large video object into a plurality of segments or fragments 24 as indicated by the broken lines separating sections 26, 28, 30, 32, and 34 of large object 12. Only the portion of video object 12 needed to reconstruct the first few frames (i.e. portion 24) is transmitted along with corresponding transformation parameters so that the first frames may be displayed with reduced latency. The remaining portions, fragments, or sections 28, 30, 32, and 34 are transmitted as dictated by the decoding requirements and bandwidth availability.

Due to timing and bandwidth restrictions, some video object portions must be transmitted at lower resolution. For example, fragment 26 may have to be transmitted at a lower resolution due to its size so that frame 22 can be generated with reduced latency. To improve such lower resolution or low quality segments, residuals of these segments may be calculated and transmitted as quality update pieces. Residual representations may be transmitted in place of other object segments so long as the delivery of the next object segment can be delayed. For example, a residual update to segment 26 could be transmitted before segment 32. Thus, in a preferred embodiment, quality update residuals are interspersed among the video object pieces or segments. Quality update pieces may be repeatedly transmitted until a desired quality is achieved, limited by the quality of the original representation.

To further improve efficiency, object segments can be analyzed to determine if update is necessary so the number of update residuals and/or object segments is reduced. For example, an analysis of object 12 would indicate that segment 34 is not required to generate any of the frames 22 of video sequence 20. Thus, if portion 34 had already been transmitted at low resolution, no residual updates would be subsequently transmitted. Preferably, portion 34 is not transmitted at all since it is not required to display video sequence 20.

As illustrated in FIG. 1, generation of a number of frames, such as frame 22 requires more than one object to be encoded, transmitted, and decoded. For example, generation of frame 22 requires transmission of at least a portion of object 16. Depending upon the amount of data required to represent object 16, it may be divided into several segments or may be transmitted as a single-segment. Each object may be separated into a different number of fragments or segments. In a preferred embodiment, segments of objects represent a column of the object. As such, each segment has the same height as the object and the segments differ only in width. Preferably, segments are constrained to be multiples of 16. The present invention assures timely delivery of all segments or fragments such that the segments are always present at the decoder before they are needed.

In one embodiment of the present invention, objects are encoded, transmitted and displayed in accordance with the MPEG-4 international standard for coding of moving pictures and associated audio information, currently under joint development by ISO and IEC. Under the current version of that standard, the present invention may be implemented with modifications limited to the Video Object Layer and Video Object Plane. Preferably, only the size and the location offset of the initial fragment of the video object is transmitted at the Video Object Layer. The transmission of the object segment is moved to the Video Object Plane along with associated trajectory points.

Figure 2A:
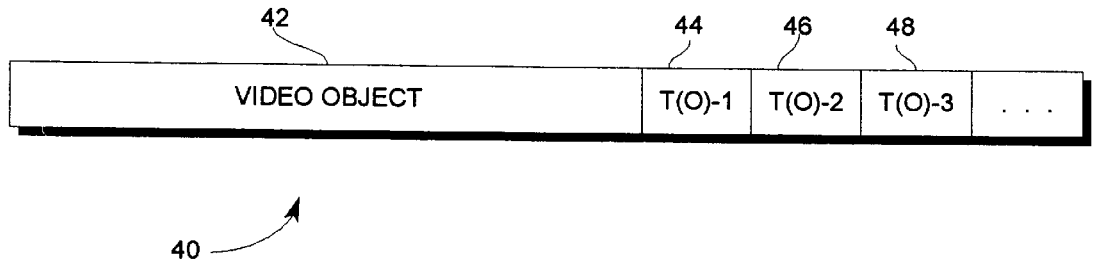
FIG. 2a is a graphical representation of a prior art data stream for a video sequence which requires transmission of the entire sprite object prior to display of any frames based on that object.

Referring now to FIG. 2a, a graphical representation of a data stream for a video sequence using a prior art method is shown. Data stream 40 includes data representing a video object 42, such as a sprite or basis object. Data representing the video object is followed by transformation parameters for one or more objects corresponding to frames 1, 2 and 3, as represented generally by reference numerals 44, 46 and 48, respectively. The prior art method requires transmission of the video object 42 along with at least transformation parameters 44 before frame generation may begin. This leads to latency and image quality which are totally dependent upon the video object 42 and the available bandwidth of the communication channel. With large sprite objects and a limited bandwidth, playback of the video sequence is characterized by a long delay (or high latency). Alternatively, image quality may be compromised due to the constraints imposed by the maximum allowable latency, the size of the sprite object, and the available bandwidth as described above.

Once a video object such as a sprite object 42 is received, it is stored by the decoder which then applies transformation parameters 44, 46 and 48 to generate subsequent frames of the video sequence. Once stored, the prior art method does not allow sprite object 42 to be updated without retransmitting the entire object.

Figure 2B:
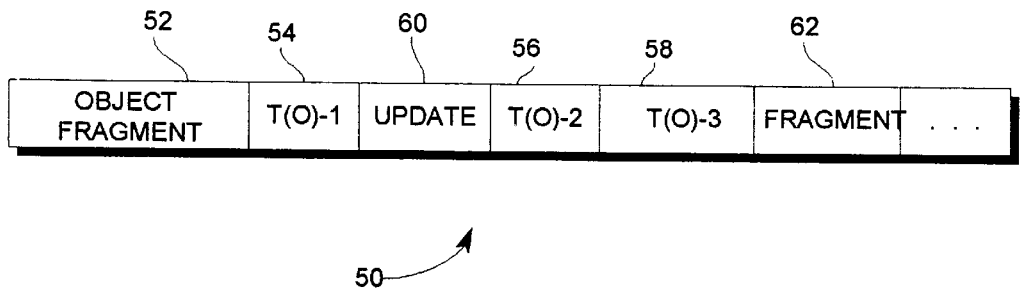
FIG. 2b is a graphical representation of a data stream for a video sequence according to the present invention which reduces latency by fragmenting or segmenting the video object.

Referring now to FIG. 2b, a graphical representation of a data stream for a video sequence according to the present invention is shown. Data stream 50 includes data representing object fragments 52 and 62, transformation parameters corresponding to various frames and/or objects, represented generally by reference numerals 54, 56 and 58, and residual update data 60. Resolution of any particular fragment may be required to be adjusted based on timing constraints and the limited bandwidth of the system.

Video object 52 is separated into a number of segments each having a size determined in part by the limited bandwidth of the channel. If a lower resolution is required, the video object may be represented using fewer quantization levels to generate a coarser approximation which requires less data. Segments or portions needed by the first few frames of the video sequence are identified and transmitted first. As such, the present invention allows generation and display of the first frame in a significantly shorter amount of time due to the reduction in the amount of data required to represent only the required portion of the video object which may also be transmitted at lower resolution when necessary. A residual representation, as represented by block 60, may be transmitted to update any low resolution fragments or portions of the video object when bandwidth is available. As such, if a greater amount of the available bandwidth must be allocated to transformation parameters, as indicated by block 58, a residual representation is not transmitted at that time. Similarly, transmission of additional fragments or segments, as represented by block 62, may be sent until the entire object is transmitted.

Figure 3:
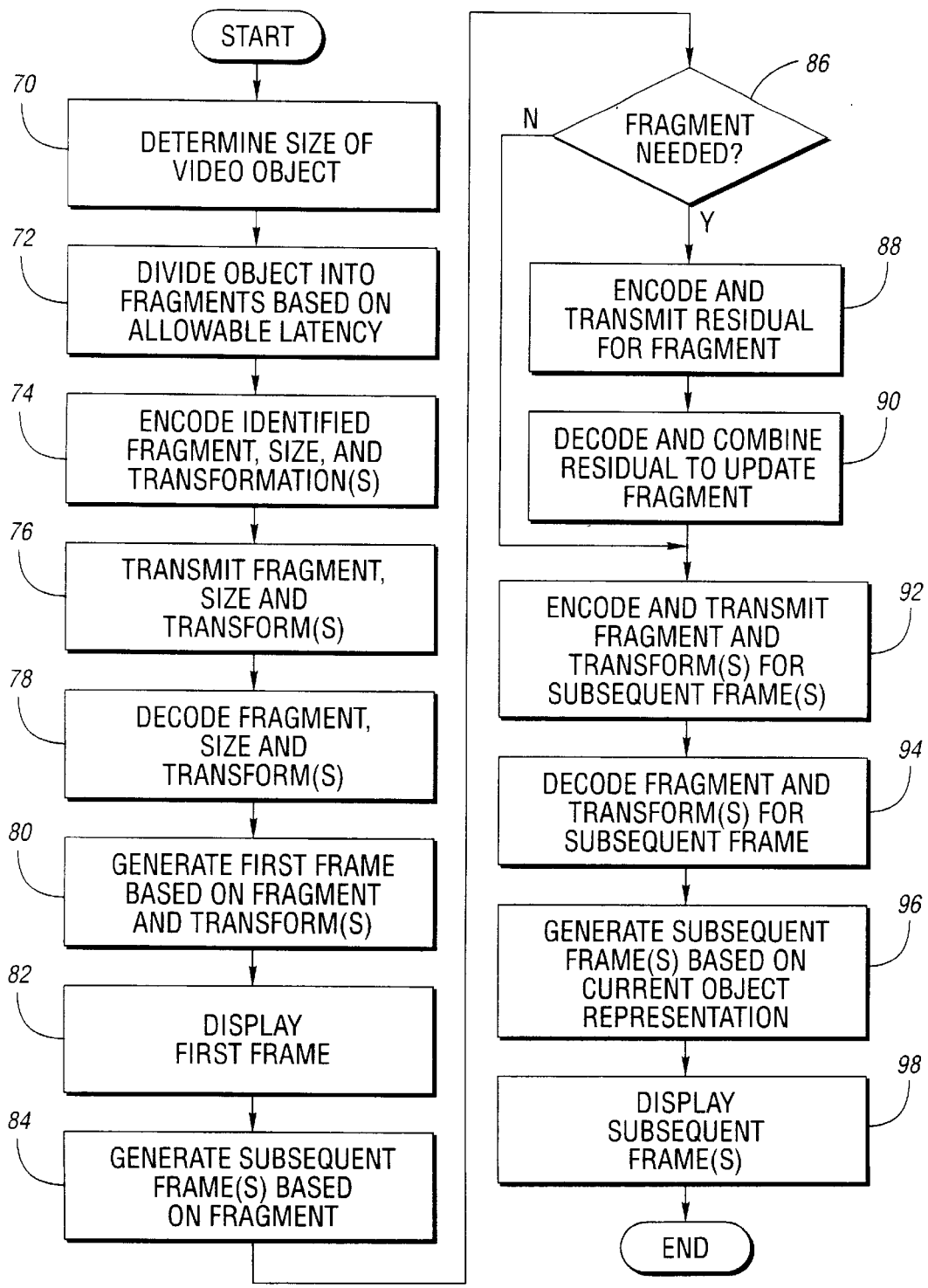
FIG. 3 is a flow diagram representing operation of a system or method according to the present invention.

Referring now to FIG. 3, a flow diagram illustrating operation of a system and method according to the present invention is shown. As will be appreciated by one of ordinary skill in the art, the operations illustrated are not necessarily sequential operations. Similarly, operations may be performed by software, hardware, or a combination of both. The present invention transcends any particular implementation and is shown in a sequential flow chart form for ease of illustration.

Block 70 of FIG. 3 represents determining the size of at least one video object. In a preferred embodiment, the various segments or fragments are separated so that each segment represents a column of the video object. As such, the various segments differ only in width. The size of the video object may be represented by the height and width of a block of pixels forming the smallest rectangle circumscribing the video object. The object is separated or divided into a plurality of segments, each having a size based in part on the limited bandwidth of the communication channel. Timing considerations such as the maximum allowable latency and the order of occurrence within the video sequence also affect this operation.

At least one of the fragments or segments necessary for generation of an initial frame is identified. This may be accomplished by assigning a priority to each of the segments corresponding to its relative order of appearance in generating the frames within the video sequence. This segment or fragment is encoded along with its size and corresponding geometric transformations necessary to generate at least the first one, and preferably the first few, frames of the sequence, as represented by block 74. The fragment is transmitted along with its corresponding size and transformation parameters as represented by block 76. A decoder is used to decode the at least one object fragment, its corresponding size, and relative transformation parameters as represented by block 78. A first frame of the video sequence is generated based on the decoded fragment and transforms, as represented by block 80. This allows display of the first frame, as represented by block 82. Because the first frame is generated based on the at least one fragment and corresponding transformation parameter rather than the entire video object, latency is reduced. Preferably, the objects are divided to allow generation of more than one frame from the originally transmitted fragment, as represented by block 84.

To further enhance efficiency, i.e. improve the compression ratio, block 86 determines whether the transmitted segment or fragment is needed to generate a subsequent one of the plurality of frames. If a particular fragment is needed for subsequent frames, block 88 encodes and transmits a residual representation of that segment to improve the resolution or quality of the object. The residual representation is decoded and combined to update the corresponding fragment, as represented by block 90. Other fragments and corresponding transform parameters for generation of subsequent frames are encoded, transmitted, and decoded as represented by blocks 92 and 94. The subsequent frames are generated based on the current representation of the video object, as represented by block 96. The subsequent frames are then displayed as represented by block 98.

Figure 4:
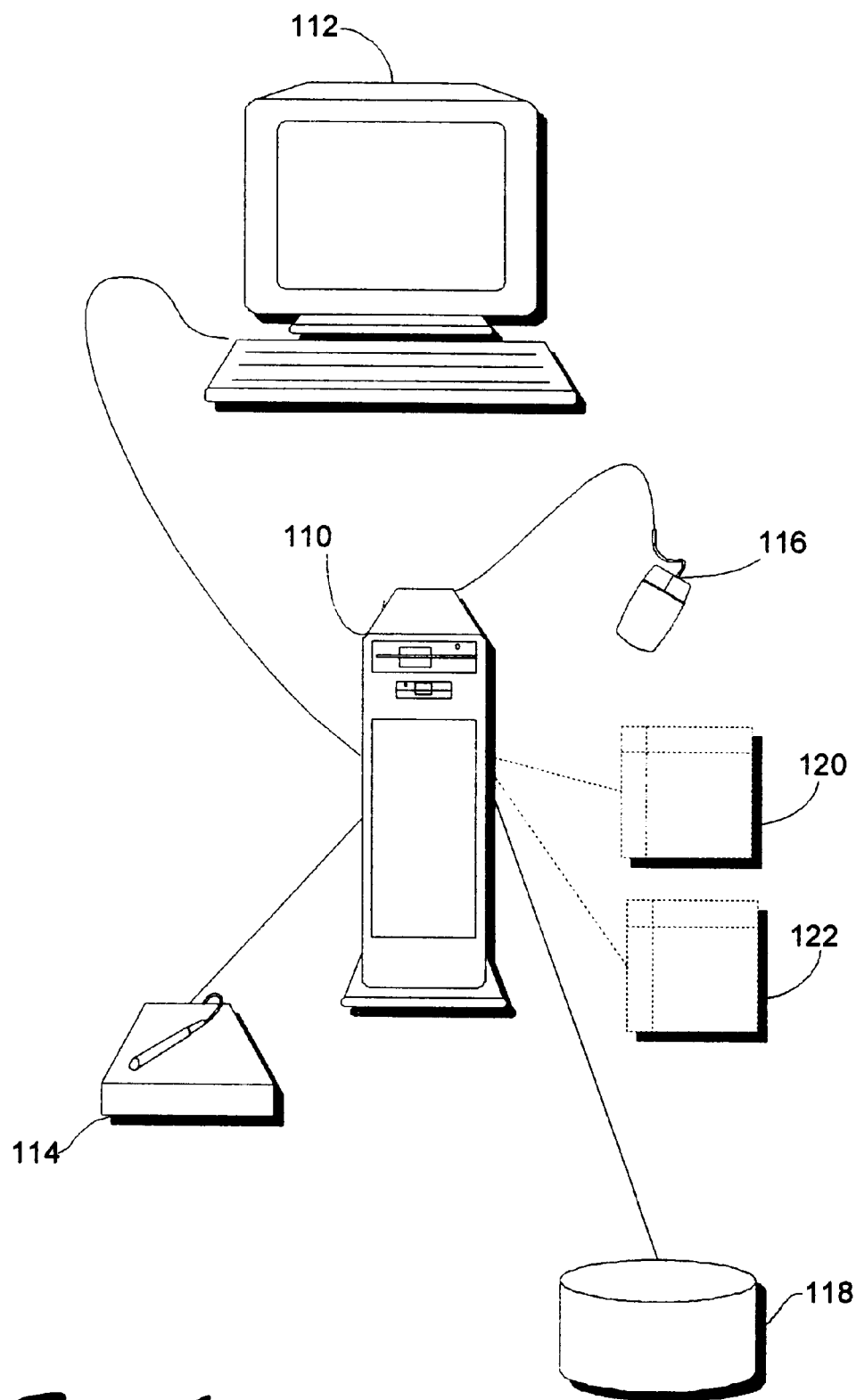
FIG. 4 is a block diagram of a system according to the present invention.

Referring now to FIG. 4, a system for displaying frames defining a video sequence based on a stored representation of at least one video object according to the present invention is shown. The system includes a processor 110 in communication with a display and keyboard 112. Processor 110 is also in communication with other input devices, such as digitizing tablet 114 and mouse 116, and a storage device 118 such as a magnetic tape or disk. Processor 110 also includes internal storage such as memories 120 and 122, as represented in phantom. Memory 120 represents video memory. Display 112 renders a visual representation of the data stored in video memory 120 as is well known in the art. Memory 122 may contain various instructions and data which are used by processor 110 in generating data representing a video sequence.

Processor 110 includes control logic which may be in the form of hardware, software, or a combination thereof. The control logic loads memory 122 with data representing a portion of at least one video object. Processor 110 then generates data representing a first one of the video frames based on the portion of the video object stored in memory 122. The generated data is stored in memory 120 to effect display of the visual representation corresponding to the video sequence. The operation of control logic within processor 110 has been illustrated and described with reference to FIG. 3 above.

Thus, the latency required to transmit a high quality representation of a video object is spread over multiple frames of the image sequence by dividing a large object and transmitting only those portions which are immediately necessary. This allows the initial frames of the sequence or scene to be decoded and viewed with significantly reduced latency. As the sequence progresses, residual representations may be used to update those segments or fragments which required reduced resolution to meet timing or bandwidth constraints. Efficiency is further improved by transmitting and updating only those portions which are necessary to display subsequent frames in the sequence.

The present invention has been simulated as part of a core experiment proposal for incorporation into the MPEG 4

Standard for Coding of Moving Pictures and Associated Audio Information. Based on the simulations, the present invention provides a significant improvement as measured by subjective image quality, total number of bits used for the first frame, and total number of bits used for the whole sequence for a number of various test sequences.

While the best mode for carrying out the invention has been described in detail, those familiar with the art to which this invention relates will recognize various alternative designs and embodiments for practicing the invention as defined by the following claims.

What is claimed is:

1. A method for transmitting a video object used in generating a plurality of frames of a video sequence over a limited bandwidth channel to reduce latency associated with display of the video sequence, the method comprising:

separating the video object into a plurality of segments, each segment being a column having a width which is a multiple of a predetermined value;

assigning a priority to each of the plurality of segments corresponding to relative order of the segment in generating the plurality of frames within the video sequence;

transmitting size of the video object;

transmitting a first one of the plurality of segments based on the corresponding priority;

transmitting transformation parameters corresponding to the first one of the plurality of segments; and generating and displaying at least one of the plurality of frames based on the first one of the plurality of segments and the transformation parameters to reduce the latency associated with the display of the video sequence.

2. The method of claim 1 wherein the step of separating the object comprises separating the object into a plurality of columns each having a width based in part on the limited bandwidth of the channel.

3. The method of claim 1 wherein the step of separating the object comprises separating the object into a plurality of segments such that at least one of the plurality of segments enables generation and display of at least one frame of the video sequence.

4. The method of claim 3 further comprising reducing resolution of the at least one of the plurality of segments to enable generation and display of the at least one frame of the video sequence.

5. The method of claim 4 further comprising transmitting a residual representation of the at least one segment transmitted with reduced resolution to improve quality of the object.

6. The method of claim 4 further comprising:

determining whether the at least one segment is needed to generate a subsequent one of the plurality of frames; and transmitting a residual representation of the at least one segment if the step of determining indicates the at least one segment is needed.

7. The method of claim 1 further comprising:

transmitting coordinates indicating position of the first one of the plurality of segments relative to a predefined reference point.

8. The method of claim 1 further comprising:

individually transmitting all of the plurality of segments along with corresponding transformation parameters based on the corresponding priority of each segment.

9. A method for reducing latency in transmitting a video sequence over a limited bandwidth channel, the video sequence having a plurality of frames derived from at least one sprite object, the method comprising:

determining size of the at least one sprite object;

dividing the at least one sprite object into a plurality of fragments, each fragment having a size based on a maximum acceptable latency;

identifying at least one of the plurality of fragments necessary for generation of an initial frame of the plurality of frames;

encoding the at least one of the plurality of fragments determined by the step of identifying, the size of the at least one sprite object, and at least one transformation parameter corresponding to the at least one fragment;

transmitting the at least one fragment, the size of the at least one sprite object, and the at least one transformation parameter over the limited bandwidth channel;

decoding the at least one fragment, the size of the at least one sprite object, and the at least one transformation parameter;

generating a first one of the plurality of frames based on the at least one fragment and the at least one transformation parameter so as to reduce the latency; and generating at least one subsequent frame of the plurality of frames based on the at least one fragment.

10. The method of claim 9 further comprising transmitting an indication of position of the at least one fragment relative to a reference point of the at least one sprite object.

11. The method of claim 9 further comprising updating the at least one fragment to enhance resolution of the at least one fragment.

12. The method of claim 11 wherein the step of updating comprises transmitting a residual representation based on a difference between an unencoded representation of the at least one fragment and a decoded representation of the at least one fragment.

13. The method of claim 12 further comprising:

determining if the at least one fragment is needed to generate a subsequent one of the plurality of frames; and transmitting the residual representation based on the step of determining.

* * * * *